(12) United States Patent
Chen

(10) Patent No.: US 12,353,095 B2
(45) Date of Patent: Jul. 8, 2025

(54) DISPLAY PANEL

(71) Applicants: HUIZHOU CHINA STAR OPTOELECTRONICS DISPLAY CO., LTD., Guangdong (CN); TCL China Star Optoelectronics Technology Co., Ltd., Guangdong (CN)

(72) Inventor: Yanling Chen, Shenzhen (CN)

(73) Assignee: TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/778,844

(22) PCT Filed: Apr. 18, 2022

(86) PCT No.: PCT/CN2022/087327
§ 371 (c)(1),
(2) Date: May 22, 2022

(87) PCT Pub. No.: WO2023/184606
PCT Pub. Date: Oct. 5, 2023

(65) Prior Publication Data
US 2025/0020958 A1    Jan. 16, 2025

(30) Foreign Application Priority Data

Apr. 2, 2022 (CN) .......................... 202210350201.9

(51) Int. Cl.
    *G02F 1/1337*    (2006.01)
    *G02F 1/1335*    (2006.01)

(52) U.S. Cl.
    CPC .. *G02F 1/133757* (2021.01); *G02F 1/133514* (2013.01)

(58) Field of Classification Search
    None
    See application file for complete search history.

(56) References Cited

U.S. PATENT DOCUMENTS

2008/0158494 A1    7/2008   Lin et al.
2010/0289975 A1*   11/2010   Nakagawa ........ G02F 1/133707
                                                                                                                                                                                                                            349/33
(Continued)

FOREIGN PATENT DOCUMENTS

CN      101918883 A     12/2010
CN      105185244 A     12/2015
(Continued)

OTHER PUBLICATIONS

Chinese Office Action issued in corresponding Chinese Patent Application No. 202210350201.9 dated Apr. 27, 2023, pp. 1-8.
(Continued)

*Primary Examiner* — Richard H Kim
(74) *Attorney, Agent, or Firm* — Nathan & Associates Patent Agents Ltd.; Menachem Nathan

(57) ABSTRACT

Disclosed is a display panel in which at least one pixel includes a red sub-pixel, a blue sub-pixel, a green sub-pixel, and a white sub-pixel, wherein each of the red sub-pixel, the blue sub-pixel, the green sub-pixel, and the white sub-pixel comprises a pixel electrode, the pixel electrode comprises a first pixel electrode and a second pixel electrode, and an absolute value of a voltage applied to a liquid crystal layer by the second pixel electrode is different from an absolute value of a voltage applied to the liquid crystal layer by the first pixel electrode.

13 Claims, 5 Drawing Sheets

(56) References Cited

U.S. PATENT DOCUMENTS

2015/0123083 A1* 5/2015 Xi ..................... G09G 3/2003
                                                    257/40
2020/0103713 A1* 4/2020 Shimoshikiryoh ....................
                                                    G02F 1/134336

FOREIGN PATENT DOCUMENTS

| CN | 107991818 A | 5/2018 |
| CN | 108027536 A | 5/2018 |
| CN | 108351557 A | 7/2018 |
| CN | 110703487 A | 1/2020 |
| CN | 110967854 A | 4/2020 |
| CN | 214896134 U | 11/2021 |
| CN | 113889047 A | 1/2022 |

OTHER PUBLICATIONS

International Search Report in International application No. PCT/CN2022/087327, mailed on Nov. 29, 2022.
Written Opinion of the International Search Authority in International application No. PCT/CN2022/087327, mailed on Nov. 29, 2022.

* cited by examiner

DISPLAY PANEL

TECHNICAL FIELD

The present disclosure relates to display technology, and in particular, to a display panel.

BACKGROUND

To solve the problem that single-domain vertical alignment (VA) liquid crystal display panels have an insufficient viewing angle, a multi-domain vertical alignment liquid crystal display panel (MVA) is proposed to improve the viewing angles, and therefore it is used widely. However, with the improvement of the resolution of liquid crystal display panels, high-resolution vertical alignment liquid crystal display panels may cause a reduction in transmittance while MVA is used to improve the viewing angle.

Therefore, how to balance the viewing angle and the transmittance is a problem for the development of the high-resolution vertical alignment liquid crystal display panels.

Technical Problems

The present disclosure is aiming to provide a display panel, with increased light transmittance and improved viewing angle.

Technical Solutions

A display panel comprises a plurality of pixels in which at least one of the pixels comprises a red sub-pixel, a blue sub-pixel, a green sub-pixel, and a white sub-pixel, wherein each of the red sub-pixel, the blue sub-pixel, the green sub-pixel, and the white sub-pixel comprises a pixel electrode, and the pixel electrode comprises a first pixel electrode and a second pixel electrode;

the display panel comprises a liquid crystal layer containing a plurality of liquid crystal molecules, wherein the liquid crystal layer corresponding to the pixel electrode of at least one of the red sub-pixel, the blue sub-pixel, the green sub-pixel, and the white sub-pixel has 2n alignment regions, and n is an integer greater than or equal to 2;

wherein, the first pixel electrode overlaps 2m continuous alignment regions of the 2n alignment regions, and inclination orientations of the liquid crystal molecules in at least two adjacent alignment regions of the 2m continuous alignment regions are different, wherein m is an integer greater than or equal to 1 and less than n; and the second pixel electrode overlaps 2n-2m continuous alignment regions of the 2n alignment regions other than the 2m continuous alignment regions, inclination orientations of the liquid crystal molecules in at least two adjacent alignment regions of the 2n-2m continuous alignment regions are different, and an absolute value of a voltage applied to the liquid crystal layer by the second pixel electrode is different from an absolute value of a voltage applied to the liquid crystal layer by the first pixel electrode.

Beneficial Effects

The present disclosure provides a display panel, in which at least one pixel comprises a red sub-pixel, a blue sub-pixel, a green sub-pixel, and a white sub-pixel, and each of the red sub-pixel, the blue sub-pixel, the green sub-pixel, and the white sub-pixel comprises a pixel electrode. The pixel electrode comprises a first pixel electrode and a second pixel electrode. An absolute value of a voltage applied by the second pixel electrode to a liquid crystal layer is different from an absolute value of a voltage applied by the first pixel electrode to the liquid crystal layer. By this configuration, the light transmittance and the viewing angle of the display panel may be improved, thereby balancing the viewing angle and the light transmittance of the display panel. Further, the liquid crystal layer corresponding to the pixel electrode of at least one of the red sub-pixel, the blue sub-pixel, the green sub-pixel, and the white sub-pixel has 2n alignment regions. The first pixel electrode overlaps 2m continuous alignment regions of the 2n alignment regions, and inclination orientations of the liquid crystal molecules in at least two adjacent alignment regions of the 2m continuous alignment regions are different. The second pixel electrode overlaps 2n-2m continuous alignment regions of the 2n alignment regions other than the 2m continuous alignment regions, and inclination orientations of the liquid crystal molecules in at least two adjacent alignment regions of the 2n-2m continuous alignment regions are different, wherein n is an integer greater than or equal to 2, m is an integer greater than or equal to 1 and less than n. By this configuration, the viewing angle of the display panel is further improved.

EMBODIMENTS OF THE INVENTION

Technical solutions in embodiments of the present disclosure will be clearly and completely described below in conjunction with drawings in the embodiments of the present disclosure. It is apparent that the described embodiments are only a part of embodiments of the present disclosure, rather than all the embodiments. Based on the embodiments in the present disclosure, all other embodiments obtained by those skilled in the art without creative effort fall within the scope of the present disclosure.

Figure 1:
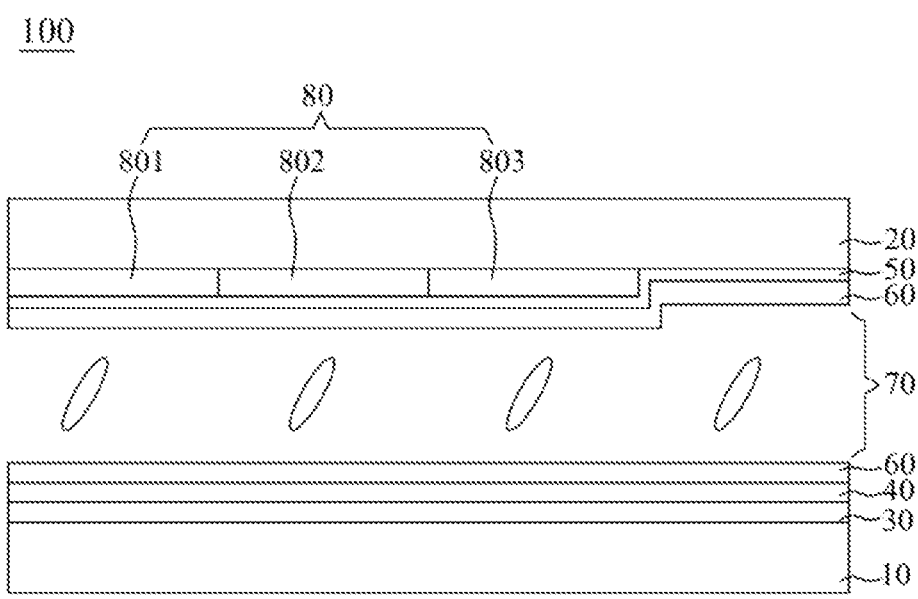
FIG. 1 is a schematic sectional view of a display panel according to an embodiment of the present disclosure.

As shown in FIG. 1, a display panel 100 comprises a first substrate 10, a second substrate 20, a thin film transistor array layer 30, a plurality of pixel electrodes 40, a common electrode 50, two alignment layers 60, a liquid crystal layer 70, and a light filter layer 80.

The first substrate 10 is disposed opposite to the second substrate 20. Both of the first substrate 10 and the second substrate 20 are a glass substrate.

The thin film transistor array layer 30 is disposed on a surface of the first substrate 10 near the second substrate 20. The thin film transistor array layer 30 comprises a plurality of thin film transistors arranged in an array. Each of the plurality of the thin film transistors may be one of a metal oxide thin film transistor, a polysilicon thin film transistor, or an amorphous silicon thin film transistor.

The plurality of pixel electrodes 40 are disposed on a surface of the first substrate 10 near the second substrate 20, and the plurality of pixel electrodes 40 are disposed on a side of the thin film transistor array layer 30 away from the first substrate 10. The plurality of pixel electrodes 40 are electrically connected to the thin film transistors in the thin film transistor array layer 30. The pixel electrodes 40 are made of any one of indium tin oxide or indium zinc oxide.

Figure 2:
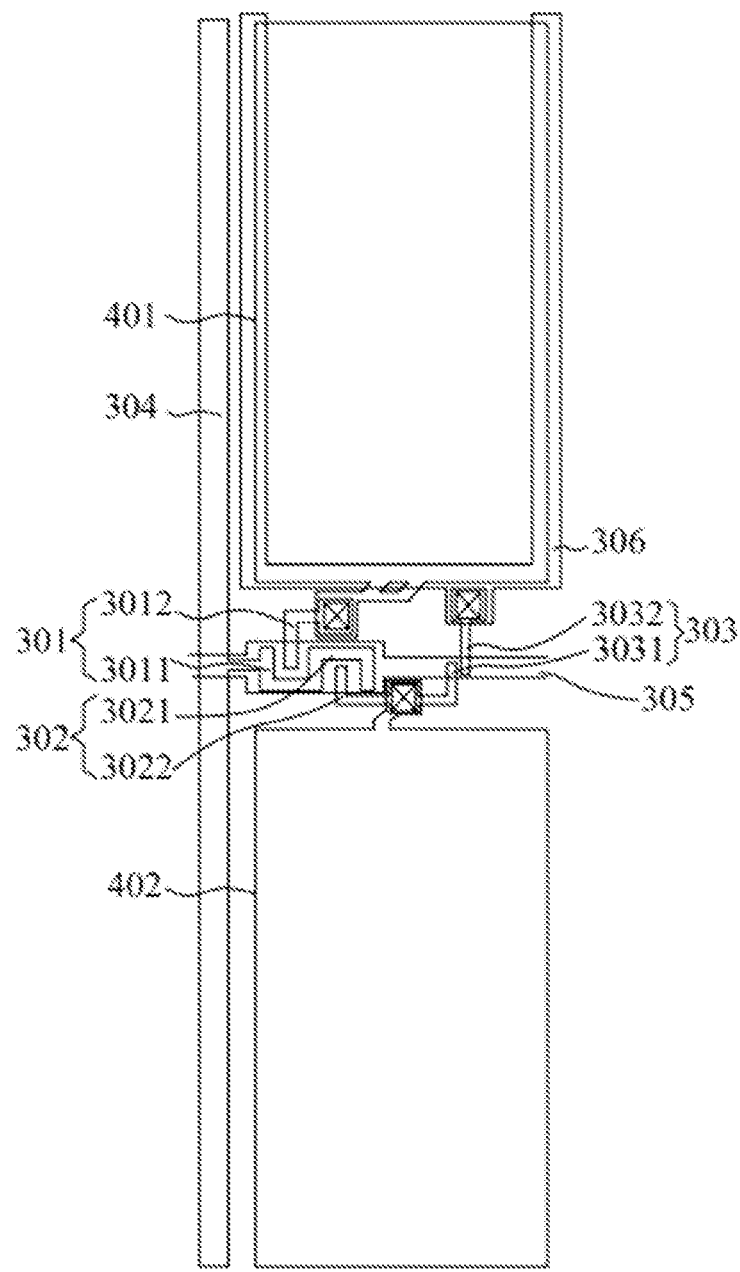
FIG. 2 is a schematic plan view of a thin film transistor array layer and a pixel electrode of FIG. 1.

As shown in FIG. 2, each of the pixel electrodes 40 comprises a first pixel electrode 401 and a second pixel electrode 402. An absolute value of a voltage applied to the liquid crystal layer 70 by the second pixel electrode 402 is different from an absolute value of a voltage applied to the liquid crystal layer 70 by the first pixel electrode 401. Therefore, the light transmittance of the first pixel electrode 401 is different from that of the second pixel electrode 402, and the brightness of light passing through the first pixel electrode 401 is different from the brightness of light passing through the second pixel electrode 402, thereby facilitating the improvement of the viewing angle of sub-pixels corresponding to the pixel electrodes 40.

Specifically, the thin film transistor array layer 30 comprises a first thin film transistor 301, a second thin film transistor 302, a third thin film transistor 303, a data line 304, a scanning line 305, and a common electrode line 306. A first source 3011 of the first thin film transistor 301 is electrically connected to the data line 304, and a first drain 3012 of the first thin film transistor 301 is electrically connected to the first pixel electrode 401. A second source 3021 of the second thin film transistor 302 is electrically connected to the first source 3011 of the first thin film transistor 301, and a second drain 3022 of the second thin film transistor 302 is electrically connected to the second pixel electrode 402. The second drain 3022 of the second thin film transistor 302 is electrically connected to a third source 3031 of the third thin film transistor 303, and a third drain 3032 of the third thin film transistor 303 is electrically connected to the common electrode line 306.

The first thin film transistor 301 is identical to the second thin film transistor 302, and the third thin film transistor 303 functions as a voltage divider such that the absolute value of the voltage applied to the liquid crystal layer 70 by the second pixel electrode 402 is smaller than the absolute value of the voltage applied to the liquid crystal layer 70 by the first pixel electrode 401. Therefore, the light transmittance of the second pixel electrode 402 is less than that of the first pixel electrode 401.

The light filter layer 80 is disposed on a surface of the second substrate 20 near the first substrate 10. The light filter layer 80 comprises red color resistors 801, green color resistors 802, and blue color resistors 803. The light filter layer 80 further comprises blank regions having no color resistor. One of the red color resistors 801, one of the green color resistors 802, one of the blue color resistors 803, and one of the blank regions having no color resistor, together as a repeating unit, are arranged in an array on the second substrate 20.

Specifically, one of the red color resistors 801 overlaps one of the pixel electrodes 40, one of the green color resistors 802 overlaps one of the pixel electrodes 40, one of the blue color resistor 803 overlaps one of the pixel electrodes 40, and one of the blank regions having no color resistor overlaps one of the pixel electrodes 40.

The common electrode 50 as a whole is disposed on a surface of the second substrate 20 near the first substrate 10, and disposed on a side of the light filter layer 80 away from the second substrate 20. The common electrode 50 is made of any one of indium tin oxide or indium zinc oxide.

One of the alignment layers 60 is disposed on a surface of the plurality of pixel electrodes 40 away from the first substrate 10, and the other alignment layer 60 is disposed on a surface of the common electrode 50 away from the second substrate 20.

The liquid crystal layer 70 is disposed between the plurality of pixel electrodes 40 and the common electrode 50, and disposed between the two alignment layers 60. The liquid crystal layer 70 comprises a plurality of liquid crystal molecules 701.

Figure 3:
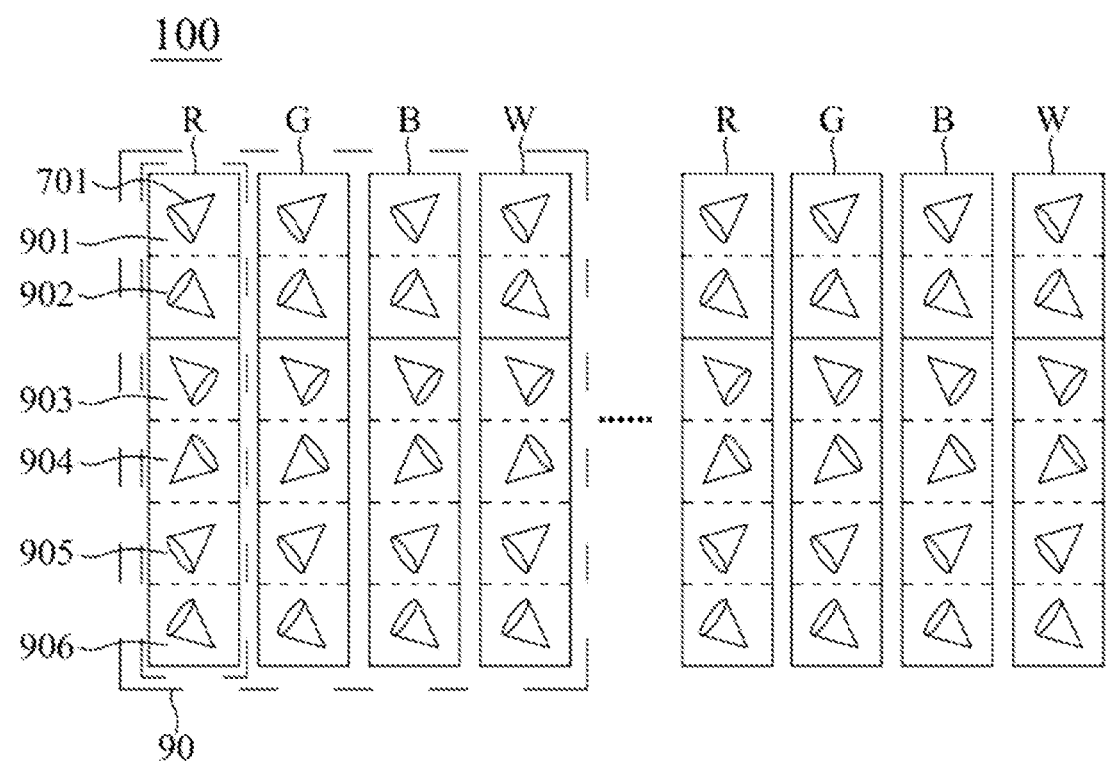
FIG. 3 is a first schematic top view of a display panel of FIG. 1.
Figure 5:
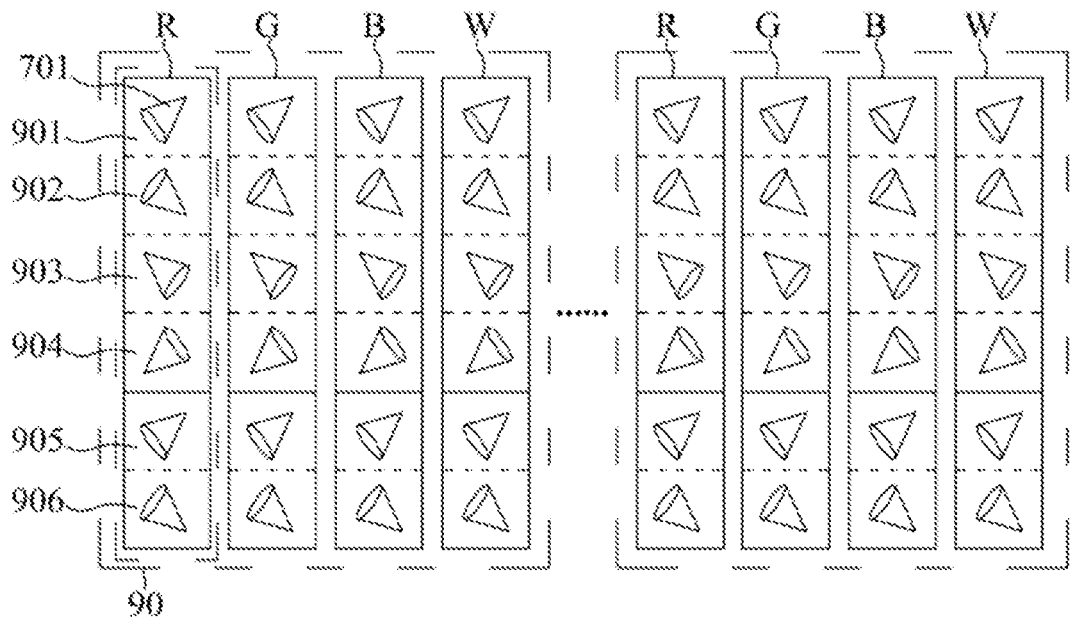
FIG. 5 is a second schematic top view of a display panel of FIG. 1.
Figure 6:
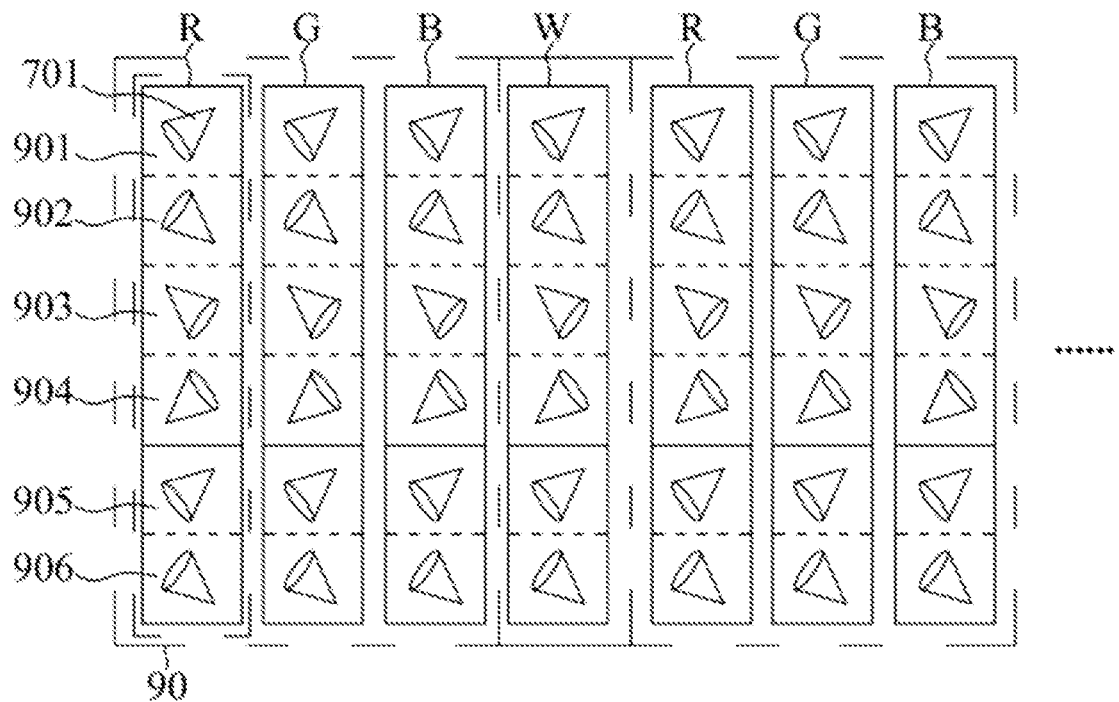
FIG. 6 is a third schematic top view of a display panel of FIG. 1.

As shown in FIGS. 3, 5 and 6, the display panel 100 comprises a plurality of pixels 90 arranged in an array along both of row direction and column direction. As shown in FIGS. 3 and 5, each of the pixels 90 comprises a red sub-pixel R, a blue sub-pixel B, a green sub-pixel G, and a white sub-pixel W. The red sub-pixel R, the green sub-pixel G, the blue sub-pixel B, and the white sub-pixel W, which are sequentially arranged side by side, are arranged in an array as a repeating unit. As shown in FIG. 6, each of the pixels 90 comprises a red sub-pixel R, a blue sub-pixel B, a green sub-pixel G, and a white sub-pixel W, and two adjacent pixels 90 share a white sub-pixel W.

The red sub-pixel R comprises one of the red color resistors 801 and one of the pixel electrodes 40 corresponding to the one of the red color resistors 801. The blue sub-pixel B comprises one of the blue color resistors 803 and one of the pixel electrodes 40 corresponding to the one of the blue color resistors 803. The green sub-pixel G comprises one of the green color resistors 802 and one of the pixel electrodes 40 corresponding to the one of the green color resistors 802. The white sub-pixel W comprises a pixel electrode 40 that overlaps a blank region having no color resistor, that is, a region corresponding to the white sub-pixel W is provided with no color resistor. Accordingly, each of the red sub-pixel R, the blue sub-pixel B, the green sub-pixel G, and the white sub-pixel W comprises one of the pixel electrodes 40.

The liquid crystal layer 70 corresponding to pixel electrodes 40 of at least one of the red sub-pixel R, the blue sub-pixel B, the green sub-pixel G, and the white sub-pixel W has 2n alignment regions, and n is an integer greater than or equal to 2. In each of the alignment regions, the liquid crystal molecules 701 are inclined along an inclination orientation.

Specifically, the liquid crystal layer 70 corresponding to a pixel electrode 40 of each of the red sub-pixel R, the blue sub-pixel B, the green sub-pixel G, and the white sub-pixel W has 2n alignment regions. In each of the red sub-pixel R, the blue sub-pixel B, the green sub-pixel G, and the white sub-pixel W, the first pixel electrode 401 overlaps 2m continuous alignment regions of the 2n alignment regions. The liquid crystal molecules 701 in at least two adjacent alignment regions of the 2m continuous alignment regions have different inclination orientations, and m is an integer greater than or equal to 1 and less than n. The second pixel electrode 402 overlaps 2n-2m continuous alignment regions other than the 2m continuous alignment regions of the 2n alignment regions, and the liquid crystal molecules 701 in at least two adjacent alignment regions of the 2n-2m continuous alignment regions have different inclination orientations.

In the present disclosure, a white sub-pixel is added to each pixel to optimize the light transmittance of the display panel, and combined with the first pixel electrode and the second pixel electrode of each of the pixel electrodes to apply different voltages to the liquid crystal layer, thereby improving the viewing angle of the display panel, and balancing the viewing angle and the light transmittance of the display panel. The liquid crystal layer corresponding to pixel electrodes of at least one of the red sub-pixel, the blue sub-pixel, the green sub-pixel, and the white sub-pixel has 2n alignment regions. The first pixel electrode overlaps 2m continuous alignment regions of the 2n alignment regions, and the liquid crystal molecules in at least two adjacent alignment regions of the 2m continuous alignment regions have different inclination orientations. The second pixel electrode overlaps 2n-2m continuous alignment regions of the 2n alignment regions other than the 2m continuous alignment regions, and the liquid crystal molecules in at least two adjacent alignment regions of the 2n-2m continuous alignment regions have different inclination orientations, thereby further improving the viewing angle of the display panel. In addition, adding a white sub-pixel to each pixel facilitates high brightness of the display panel, reduces power consumption required by the display panel, and facilitates the display panel to display richer colors.

As shown in FIGS. 3, 5 and 6, when the value of n is 3, the liquid crystal layer 70 corresponding to a pixel electrode 40 of each of the red sub-pixel R, the blue sub-pixel B, the green sub-pixel G, and the white sub-pixel W has six alignment regions, and the six alignment regions comprise a first alignment region 901, a second alignment region 902, a third alignment region 903, a fourth alignment region 904, a fifth alignment region 905, and a sixth alignment region 906 sequentially arranged along a direction of a long side of sub-pixels.

It is noted that the value of n may also be 2 or 4. Compared with the value of n being 2, the display panel 100 has a better viewing angle when the value of n is 3. In addition, when the value of n is 3, the display panel has a higher light transmittance than the case that the value of n is 4, because when the value of n is 4, it may lead to introduction of excessive metal wiring to the display panel, thereby reducing the light transmittance of the display panel. Therefore, when the value of n is 3, the viewing angle and the light transmittance of the display panel 100 can be better balanced, compared to the value of n being 2 or 4.

The inclination orientation of the liquid crystal molecules 701 in the first alignment region 901 is different from that in the second alignment region 902; the inclination orientation of the liquid crystal molecules 701 in the third alignment region 903 is different from that in the fourth alignment region 904; and the inclination orientation of the liquid crystal molecules 701 in the fifth alignment region 905 is different from that in the sixth alignment region 906, thereby further improving the viewing angle of the display panel 100.

The inclination orientations of the liquid crystal molecules 701 in the first alignment region 901, the second alignment region 902, the third alignment region 903, and the fourth alignment region 904 are different from each other to further improve the viewing angle of the display panel 100. The liquid crystal molecules 701 in the fifth alignment region 905 have a same inclination orientation as that in the first alignment region 901; and the liquid crystal molecules 701 in the sixth alignment region 906 have a same inclination orientation as that in the second alignment region 902, so that the respective inclination orientation of the liquid crystal molecules 701 in the third alignment region 903, the fourth alignment region 904, the fifth alignment region 905, and the sixth alignment region 906 is different from each other.

It is noted that different inclination orientations can be adopted, for example, the inclination orientations of the liquid crystal molecules 701 in the first alignment region 901, the second alignment region 902, the third alignment region 903, and the fourth alignment region 904 are different from each other, while the liquid crystal molecules 701 in the fifth alignment region 905 have a same inclination orientation as that in the third alignment region 903; and the liquid crystal molecules 701 in the sixth alignment region 906 have a same inclination orientation as that in the fourth alignment region 904.

When one direction along the short side of the sub-pixel is defined as 0 degree, the inclination orientations of liquid crystal molecules in the first alignment region 901, the second alignment region 902, the third alignment region 903, and the fourth alignment region 904 are $\alpha$ degrees, $(360-\alpha)$ degrees, $(180-\alpha)$ degrees, and $(180+\alpha)$ degrees, respectively, and $\alpha$ is greater than 0 and less than 90. The value of $\alpha$ may be 20, 30, 40, 45, 55, 65, 70 or 80.

Specifically, as shown in FIGS. 3, 5, and 6, the inclination orientation of the liquid crystal molecules 701 in the first alignment region 901 is $\alpha$ degrees, and the inclination orientation of the liquid crystal molecules 701 in the second alignment region 902 is $(360-\alpha)$ degrees. That is, the inclination orientation of the liquid crystal molecules 701 in the first alignment region 901 is mirror-symmetrical to the inclination orientation of the liquid crystal molecules 701 in the second alignment region 902. The inclination orientation of the liquid crystal molecules 701 in the third alignment region 903 is $(180-\alpha)$ degrees, and the inclination orientation of the liquid crystal molecules 701 in the fourth alignment region 904 is $(180+\alpha)$ degrees. That is, the inclination orientation of the liquid crystal molecules 701 in the third alignment region 903 is mirror-symmetrical to the inclination orientation of the liquid crystal molecules 701 in the fourth alignment region 904. The inclination orientation of the liquid crystal molecules 701 in the fifth alignment region 905 is $\alpha$ degrees, and the inclination orientation of the liquid crystal molecules 701 in the sixth alignment region 906 is $(360-\alpha)$ degrees. That is, the inclination orientation of the liquid crystal molecules 701 in the fifth alignment region 905 is mirror-symmetrical to the inclination orientation of the liquid crystal molecules 701 in the sixth alignment region 906. By this configuration, the viewing angle of the display panel 100 is further improved.

For example, when $\alpha$ is equal to 45, the inclination orientations of the liquid crystal molecules 701 in the first alignment region 901, the second alignment region 902, the third alignment region 903, the fourth alignment region 904, the fifth alignment region 905, and the sixth alignment region 906, are 45 degrees, 315 degrees, 135 degrees, 225 degrees, 45 degrees, and 315 degrees, respectively.

It is noted that, the inclination orientation of the liquid crystal molecules 701 in the first alignment region 901 may also be $(180-\alpha)$ degrees, while the inclination orientation of the liquid crystal molecules 701 in the second alignment region 902 is $(180+\alpha)$ degrees. The inclination orientation of the liquid crystal molecules 701 in the third alignment region 903 may also be $\alpha$ degrees, and the inclination orientation of the liquid crystal molecules 701 in the fourth alignment region 904 is $(360-\alpha)$ degrees. The inclination orientation of the liquid crystal molecules 701 in the fifth alignment region 905 is $(180-\alpha)$ degrees, and the inclination orientation of the liquid crystal molecules 701 in the sixth alignment region 906 is (180 +α) degrees.

As shown in FIG. 3, the first pixel electrode 401 overlaps the first alignment region 901 and the second alignment region 902. The second pixel electrode 402 overlaps the third alignment region 903, the fourth alignment region 904, the fifth alignment region 905, and the sixth alignment region 906. Therefore, the brightness of light that passes through the two alignment regions overlapping the first pixel electrode 401 is larger than the brightness of light that passes through the four alignment regions overlapping the second pixel electrode 402, so as to improve the viewing angle of the display panel 100, increase the light transmittance of the display panel 100, and reduce dark lines.

When the value of n is 3, the first pixel electrode 401 has two domains and the second pixel electrode 402 has four domains.

Figure 4:
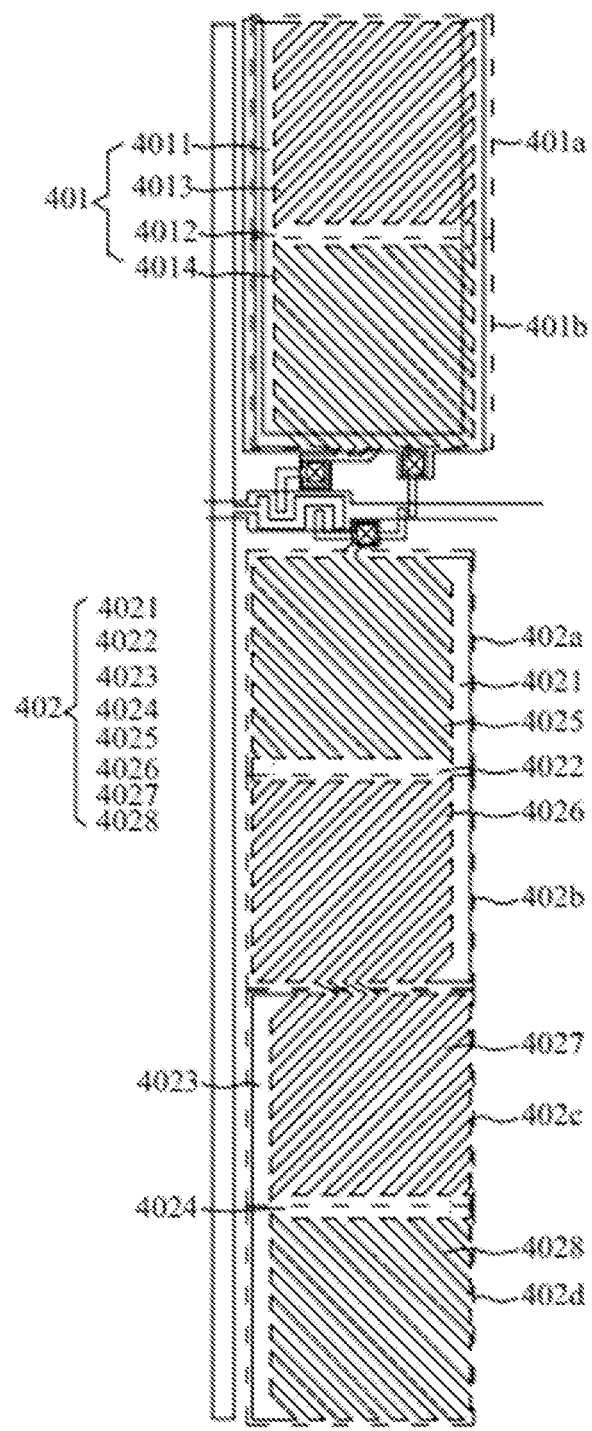
FIG. 4 is a schematic plan view of a thin film transistor array layer and a pixel electrode in a sub-pixel of FIG. 3.

As shown in FIG. 4, the first pixel electrode 401 comprises a first vertical primary electrode 4011, a first horizontal primary electrode 4012, a plurality of first slits 4013, and a plurality of second slits 4014. The first vertical primary electrode 4011 extends in a same direction as the data line 304. The first horizontal primary electrode 4012 is perpendicular to the first vertical primary electrode 4011, and the first horizontal primary electrode 4012 is connected to an intermediate position of the first vertical primary electrode 4011 and divides the first pixel electrode 401 into a first domain 401a and a second domain 401b. The first domain 401a overlaps the first alignment region 901, and the second domain 401b overlaps the second alignment region 902. The plurality of first slits 4013 are disposed in the first domain 401a and parallel to each other. The first slits 4013 extend in a same direction as the inclination orientation of the liquid crystal molecules 701 in the first alignment region 901. The plurality of second slits 4014 are disposed in the second domain 401b and parallel to each other, and the plurality of second slits 4014 extend in a same direction as the inclination orientation of the liquid crystal molecules 701 in the second alignment region 902.

The second pixel electrode 402 comprises a second vertical primary electrode 4021, a second horizontal primary electrode 4022, a third vertical primary electrode 4023, a third horizontal primary electrode 4024, a plurality of third slits 4025, a plurality of fourth slits 4026, a plurality of fifth slits 4027, and a plurality of sixth slits 4028. Each of the second vertical primary electrode 4021 and the third vertical primary electrode 4023 is parallel to the first vertical primary electrode 4011, and each of the second horizontal primary electrode 4022 and the third horizontal primary electrode 4024 is parallel to the first horizontal primary electrode 4012.

The second horizontal primary electrode 4022 is connected to a middle of the second vertical primary electrode 4021, and the third horizontal primary electrode 4024 is connected to an intermediate position of the third vertical primary electrode 4023. The second horizontal primary electrode 4022 and the third horizontal primary electrode 4024 divide the second pixel electrode 402 into a third domain 402a, a fourth domain 402b, a fifth domain 402c, and a sixth domain 402d that are sequentially arranged. The third domain 402a overlaps the third alignment region 903, the fourth domain 402b overlaps the fourth alignment region 904, the fifth domain 402c overlaps the fifth alignment region 905, and the sixth domain 402d overlaps the sixth alignment region 906.

The plurality of third slits 4025 are disposed in the third domain 402a and are parallel to each other, and the third slits 4025 extend in a same direction as the inclination orientation of the liquid crystal molecules 701 in the third alignment region 903. The plurality of fourth slits 4026 are disposed in the fourth domain 402b and are parallel to each other, and the fourth slits 4026 extend in a same direction as the inclination orientation of the liquid crystal molecules 701 in the fourth alignment region 904. The plurality of fifth slits 4027 are disposed in the fifth domain 402c and are parallel to each other, and the fifth slits 4027 extend in a same direction as the inclination orientation of the liquid crystal molecules 701 in the fifth alignment region 905. The plurality of sixth slits 4028 are disposed in the sixth domain 402d and are parallel to each other, and the sixth slits 4028 extend in a same direction as the inclination orientation of the liquid crystal molecules 701 in the sixth alignment region 906.

As shown in FIGS. 5 and 6, the first pixel electrode 401 overlaps the first alignment region 901, the second alignment region 902, the third alignment region 903, and the fourth alignment region 904, and the second pixel electrode 402 overlaps the fifth alignment region 905 and the sixth alignment region 906. Therefore, the brightness of light that passes through the four alignment regions corresponding to the first pixel electrode 401 is greater than the brightness of light that passes through the two alignment regions corresponding to the second pixel electrode 402, so as to improve the viewing angle of the display panel 100, increase the light transmittance of the display panel 100, and reduce dark lines.

The present disclosure further provides a display device comprising the display panel and a backlight module, and the backlight module is located on the light output side of the display panel.

The description of the above embodiments is merely intended to help understand the technical solutions and core idea of the present disclosure. Those of ordinary skill in the art will understand that it is still possible to modify the technical solutions described in the foregoing embodiments, or to equivalently substitute some of the technical features thereof. These modifications or substitutions do not depart from the essence of the corresponding technical solutions and the scope of the technical solutions of the embodiments of the present disclosure.

What is claimed is:

1. A display panel comprising a plurality of pixels in which at least one of the pixels comprises a red sub-pixel, a blue sub-pixel, a green sub-pixel, and a white sub-pixel, wherein the display panel comprises:
   a first substrate;
   a second substrate disposed opposite to the first substrate;
   a common electrode disposed on a surface of the second substrate near the first substrate;
   a pixel electrode disposed corresponding to each of the red sub-pixel, the blue sub-pixel, the green sub-pixel, and the white sub-pixel, wherein the pixel electrode is located on a surface of the first substrate near the second substrate, and comprises a first pixel electrode and a second pixel electrode;
   a light filter layer comprising a red color resistor of the red sub-pixel, a blue color resistor of the blue sub-pixel, and a green color resistor of the green sub-pixel, wherein a region of the light filter layer corresponding to the white sub-pixel is provided with no color resistor; and
   a liquid crystal layer containing a plurality of liquid crystal molecules and disposed between the pixel electrode and the common electrode, wherein the liquid crystal layer corresponding to at least one of the red sub-pixel, the blue sub-pixel, the green sub-pixel, and the white sub-pixel has a first alignment region, a second alignment region, a third alignment region, a fourth alignment region, a fifth alignment region, and a sixth alignment region that are sequentially arranged along a direction of a long side of sub-pixels, the first pixel electrode overlaps the first alignment region, the second alignment region, the third alignment region, and the fourth alignment region, and the second pixel electrode overlaps the fifth alignment region and the sixth alignment region, an absolute value of a voltage applied to the liquid crystal layer by the second pixel electrode is less than an absolute value of a voltage applied to the liquid crystal layer by the first pixel electrode, and in a case that a direction along a short side of sub-pixels is defined as 0 degree, the liquid crystal molecules in the first alignment region, the second alignment region, the third alignment region, or the fourth alignment region have an inclination orientation of one of $\alpha$ degrees, $(360-\alpha)$ degrees, $(180-\alpha)$ degrees, and $(180+\alpha)$ degrees, respectively, and $\alpha$ is greater than 0 and less than 90.

2. The display panel according to claim 1, wherein an inclination orientation of the liquid crystal molecules in the fifth alignment region is different from an inclination orientation in the sixth alignment region.

3. A display panel comprising a plurality of pixels and a pixel electrode, wherein at least one of the pixels comprises a red sub-pixel, a blue sub-pixel, a green sub-pixel, and a white sub-pixel, the pixel electrode corresponds to each of the red sub-pixel, the blue sub-pixel, the green sub-pixel, and the white sub-pixel, and the pixel electrode comprises a first pixel electrode and a second pixel electrode;

wherein the display panel comprises a liquid crystal layer containing a plurality of liquid crystal molecules, and the liquid crystal layer corresponding to at least one of the red sub-pixel, the blue sub-pixel, the green sub-pixel, and the white sub-pixel has a first alignment region, a second alignment region, a third alignment region, a fourth alignment region, a fifth alignment region, and a sixth alignment region that are sequentially arranged along a direction of a long side of sub-pixels, the first pixel electrode overlaps the first alignment region, the second alignment region, the third alignment region, and the fourth alignment region, and the second pixel electrode overlaps the fifth alignment region and the sixth alignment region;

an absolute value of a voltage applied to the liquid crystal layer by the second pixel electrode is less than an absolute value of a voltage applied to the liquid crystal layer by the first pixel electrode, and in a case that a direction along a short side of sub-pixels is defined as 0 degree, the liquid crystal molecules in the first alignment region, the second alignment region, the third alignment region, or the fourth alignment region have an inclination orientation of one of $\alpha$ degrees, $(360-\alpha)$ degrees, $(180-\alpha)$ degrees, and $(180+\alpha)$ degrees, respectively, and $\alpha$ is greater than 0 and less than 90.

4. The display panel according to claim 3, wherein an inclination orientation of the liquid crystal molecules in the fifth alignment region is different from an inclination orientation in the sixth alignment region.

5. The display panel according to claim 3, wherein an inclination orientation of the liquid crystal molecules in the fifth alignment region is same as an inclination orientation in the first alignment region; and an inclination orientation of the liquid crystal molecules in the sixth alignment region is same as an inclination orientation in the second alignment region.

6. The display panel according to claim 3, wherein the liquid crystal molecules in the first alignment region have an inclination orientation of $\alpha$ degrees, the liquid crystal molecules in the second alignment region have an inclination orientation of $(360-\alpha)$ degrees, the liquid crystal molecules in the third alignment region have an inclination orientation of $(180-\alpha)$ degrees, and the liquid crystal molecules in the fourth alignment region have an inclination orientation of $(180+\alpha)$ degrees.

7. The display panel according to claim 6, wherein $\alpha$ is 45.

8. The display panel according to claim 3, wherein one of the red sub-pixel, one of the blue sub-pixel, one of the green sub-pixel and one of the white sub-pixel are configured to be a repeating unit that is disposed repeatedly.

9. The display panel according to claim 3, wherein two adjacent pixels share one white sub-pixel.

10. The display panel according to claim 3, wherein the display panel further comprises:
a first substrate;
a second substrate disposed opposite to the first substrate; and
a common electrode disposed on a surface of the second substrate near the first substrate;
wherein the pixel electrode is disposed on a surface of the first substrate near the second substrate, and the liquid crystal layer is disposed between the pixel electrode and the common electrode.

11. The display panel according to claim 3, wherein the display panel further comprises:
a light filter layer comprising a red color resistor of the red sub-pixel, a blue color resistor of the blue sub-pixel, and a green color resistor of the green sub-pixel, wherein a region of the light filter layer corresponding to the white sub-pixel is provided with no color resistor.

12. The display panel according to claim 1, wherein the liquid crystal molecules in the fifth alignment region has an inclination orientation of $\alpha$ degrees, and the liquid crystal molecules in the sixth alignment region has an inclination orientation of $(360-\alpha)$ degrees.

13. The display panel according to claim 3, wherein the liquid crystal molecules in the fifth alignment region has an inclination orientation of $\alpha$ degrees, and the liquid crystal molecules in the sixth alignment region has an inclination orientation of $(360-\alpha)$ degrees.

* * * * *